(12) United States Patent
Chen

(10) Patent No.: US 8,887,395 B2
(45) Date of Patent: Nov. 18, 2014

(54) METHOD FOR ASSEMBLING OR DISASSEMBLING SPOKES OF A TUBELESS WHEEL

(71) Applicant: Shu-Yi Chen, Taichung (TW)

(72) Inventor: Shu-Yi Chen, Taichung (TW)

(73) Assignee: Mega Composite Technology Co., Ltd., Taichung (TW)

(*) Notice: Subject to any disclaimer, the term of this patent is extended or adjusted under 35 U.S.C. 154(b) by 206 days.

(21) Appl. No.: 13/741,321

(22) Filed: Jan. 14, 2013

(65) Prior Publication Data

US 2014/0196288 A1 Jul. 17, 2014

(51) Int. Cl.
*B21K 1/34* (2006.01)
*B60B 31/00* (2006.01)
*B60B 21/06* (2006.01)

(52) U.S. Cl.
CPC ............. *B60B 31/005* (2013.01); *B60B 21/062* (2013.01)

USPC ............ 29/894.342; 29/894.333; 29/894.341; 301/35.59; 301/58

(58) Field of Classification Search
CPC ............................ B60B 21/062; B60B 31/005
USPC ................ 29/894.34, 894.343, 433, 894.333, 29/894.341, 894.342, 894.351; 301/35.59, 301/58, 34
See application file for complete search history.

(56) References Cited

U.S. PATENT DOCUMENTS

2009/0014129 A1* 1/2009 Hsu ................................. 157/1.5

* cited by examiner

*Primary Examiner* — David Bryant
*Assistant Examiner* — Ruth G Hidalgo-Hernande

(57) ABSTRACT

A method for assembling or disassembling spokes of a tubeless wheel includes following steps: selecting a rim, assembling an adaptor onto an assembling tool, assembling the adaptor to the position hole, assembling a spoke, assembling the spoke to the adaptor and disassembling the assembling tool from the adaptor. Therefore, a user can assemble or disassemble the spokes easily and conveniently.

6 Claims, 7 Drawing Sheets

METHOD FOR ASSEMBLING OR DISASSEMBLING SPOKES OF A TUBELESS WHEEL

BACKGROUND OF THE INVENTION

1. Field of the Invention

The present invention relates to a method, and more particularly to a method for assembling or disassembling spokes of the tubeless wheel.

2. Description of Related Art

Cycling has become a trend all over the world since it is energy-saving and zero-pollution. A rim is one of the most important parts of a bicycle. Recently, a tubed wheel with an inner tube is replaced by a tubeless wheel without an inner tube since the tubeless wheel is safer than the tubed wheel.

A conventional method for assembling or disassembling spokes of a tubeless wheel comprises a rim, a plurality of spokes, a plurality of connecting rods and a plurality of casings. The rim has a plurality of through holes uniformly opened therethrough. Each spoke has a threaded portion defined at one end thereof. Each connecting rod has a threaded hole opened at one end thereof and a head portion defined at another end thereof. A diameter of the head portion of each connecting rod is slightly smaller than a diameter of each corresponding through hole of the rim. Each casing has a flange formed at one end thereof and a wedged portion defined at another end thereof. A diameter of the flange of each casing is larger than the diameter of each corresponding through hole of the rim. A diameter of the wedged portion of each casing is smaller than the diameter of each corresponding through hole of the rim.

Upon assembling, the wedged portion of each casing is sleeved on each corresponding connecting rod firstly so that a bottom of the wedged portion is abutted against a top of the head portion of each corresponding connecting rod; then, each connecting rod sleeved by each corresponding casing is inserted into each corresponding through hole of the rim from an outer side of each corresponding through hole of the rim, so that the flange of each corresponding casing is abutted against the outer side of the rim; and then, the head portion of each connecting rod is pulled toward an inner side of each corresponding through hole of the rim; thereafter, the threaded portion of each spoke is screwed into the threaded hole of each corresponding connecting rod; finally, by pulling each connecting rod, the head portion of each connecting rod compels the wedged portion of each corresponding casing to expand, so that the wedged portion which is expanded abuts against the inner side of each corresponding through hole of the rim. Therefore, each casing, each connecting rod and each spoke are securely assembled onto the rim. Besides, the wedged portion is flexible so as to allow each corresponding connecting rod and the spoke swing freely after assembling onto the rim. Although the conventional method for assembling or disassembling spokes of a tubeless wheel can efficiently position the spokes onto the rim and allows a rider to assemble or disassemble the spokes by himself or herself, the conventional method for assembling or disassembling spokes of a tubeless wheel still has several disadvantages as following.

First, the structures of the connecting rods and the casings are complicated. Therefore, if either the connecting rod or the casing is broken, the rim cannot move smoothly and may cause a danger to the rider.

Second, the connecting rod is position in the through hole by the casing, and the flexible wedge portion of the casing is abutted against the inner side of each corresponding through hole of the rim. Therefore, if a centripetal force from the spoke is too large, the spoke might be pulled out from the rim unexpectedly because the wedge portion is flexible; as a result, a rotation of the rim is interfered and may directly cause a danger to the rider.

The present invention has arisen to mitigate and/or obviate the disadvantages of the conventional method for assembling or disassembling spokes of a tubeless wheel.

SUMMARY OF THE INVENTION

The main objective of the present invention is to provide an improved method for assembling or disassembling spokes of a tubeless wheel.

To achieve the objective, a method for assembling or disassembling spokes of a tubeless wheel comprising a plurality of steps: first, selecting a rim: the rim having a tire assembling groove defined around an outer periphery thereof, a channel defined between the tire assembling groove and an inner periphery of the rim, a plurality of through holes and a plurality of position holes uniformly opened around the inner periphery of the rim therethrough, each through hole corresponding to each corresponding position hole, the through holes and the position holes all communicating with the channel, each through hole adjunct to each corresponding position hole, and a distance defined between each through hole and each corresponding position hole; second, assembling an adaptor onto an assembling tool: the adaptor having a first end defined at one end thereof and a second end defined at another end thereof, the assembling tool having a hook portion defined at one end thereof, the first end of the adaptor screwed onto the hook portion of the assembling tool; third, assembling the adaptor to the position hole: the second end and the first end of the adaptor sequentially inserted into the through hole firstly; and then, the assembling tool operated so as to make the second end of the adaptor pass through the corresponding position hole from the channel toward an outside relative to the rim; as a result, the adaptor positioned at the corresponding position hole; fourth, assembling a spoke: one end of a spoke assembled onto a hub and another end of the spoke inserted into the second end of the adaptor; and fifth, assembling the spoke to the adaptor and disassembling the assembling tool from the adaptor: the adaptor rotated counterclockwise so that another end of the spoke screwed into the second end of the adaptor and the hook portion of the assembling tool unscrewed from the first end of the adaptor via said counterclockwise rotation; then, the assembling tool operated, so as to guide the hook portion of the assembling tool through the through hole, so that the assembling tool is took out from the through hole of the rim. Wherein, the present invention further comprises a flexible seal, the flexible seal is used to flexibly seal the through hole, the flexible seal is normally assembled at the through hole, the flexible seal is removed from the through hole before the hook portion passes through the through hole; an abutting portion is formed between the first end and the second end of the adaptor, a cross-sectional area of the abutting portion is larger than both a cross-sectional area of the first end and a cross-sectional area of the second end; the cross-sectional area of the abutting portion is larger than an area of the position hole, so that the adaptor is abutted against a periphery of the position hole via the abutting portion so as to position the adaptor securely at the position hole; the cross-sectional area of the abutting portion is smaller than an area of the through hole; and a circular buckle is defined at on one end of the spoke, the circular buckle of the spoke is used to be buckled at the hub so as to position the spoke securely on the hub.

Therefore, a user can assemble or disassemble the spokes easily and conveniently.

Further benefits and advantages of the present invention will become apparent after a careful reading of the detailed description with appropriate reference to the accompanying drawings.

DETAILED DESCRIPTION OF THE INVENTION

Figure 1:
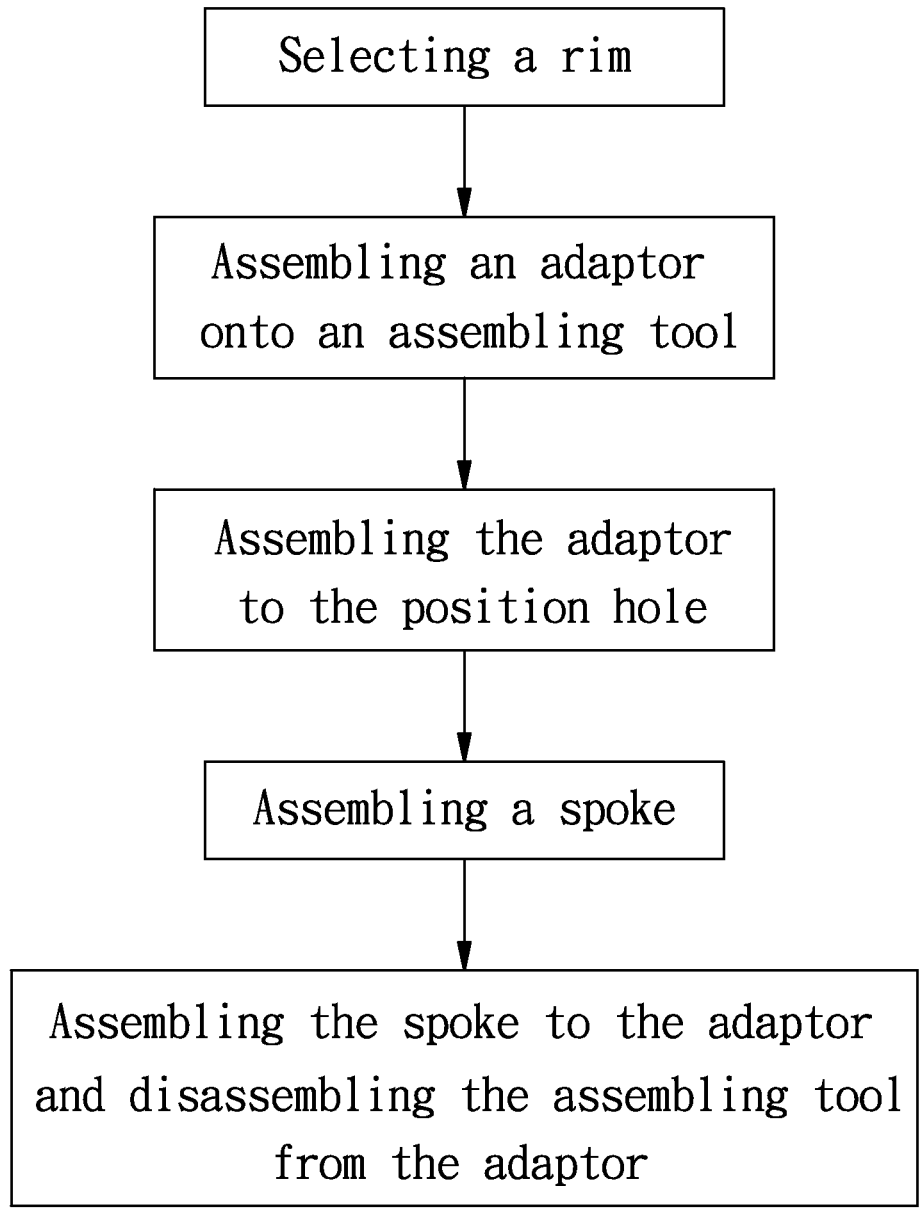
FIG. 1 is a flowchart of a method for assembling or disassembling spokes of a tubeless wheel of the present invention.
Figure 2:
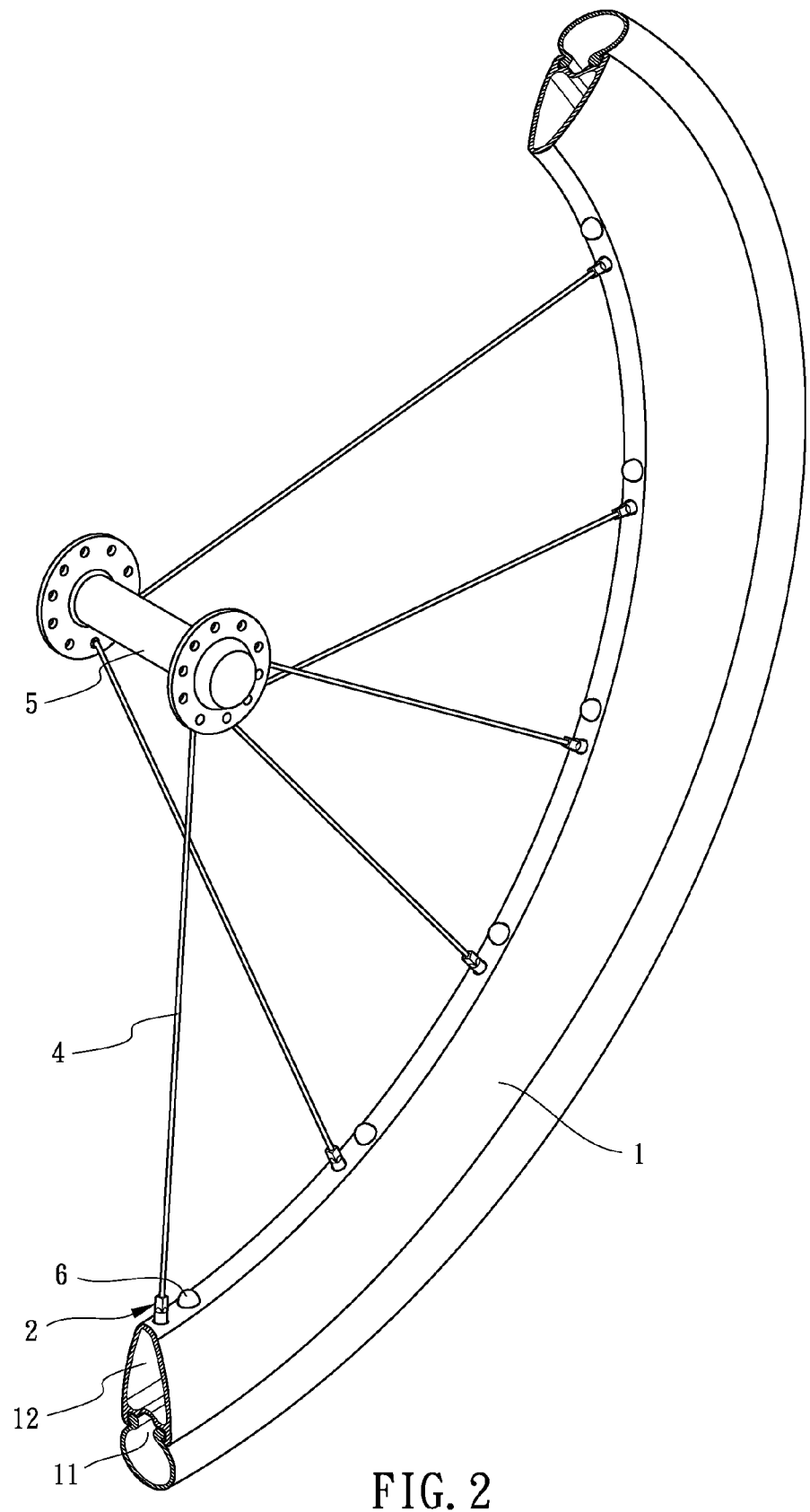
FIG. 2 is a partially perspective view of the present invention.

Referring to FIGS. 1-7, steps of a method for assembling or disassembling spokes of a tubeless wheel are shown as following.

First, selecting a rim 1: the rim 1 has a tire assembling groove 11 defined around an outer periphery thereof; a channel 12 which is hollow is defined between the tire assembling groove 11 and an inner periphery of the rim 1; a plurality of through holes 13 and a plurality of position holes 14 are uniformly opened around the inner periphery of the rim 1 therethrough; each through hole 13 corresponds to each corresponding position hole 14; the through holes 13 and the position holes 14 all communicate with the channel 12; each through hole 13 is adjunct to each corresponding position hole 14; and a distance is defined between each through hole 13 and each corresponding position hole 14.

Second, assembling an adaptor 2 onto an assembling tool 3: the adaptor 2 has a first end 21 defined at one end thereof and a second end 22 defined at another end thereof. The assembling tool 3 has a hook portion 31 defined at one end thereof. The first end 21 of the adaptor 2 is screwed onto the hook portion 31 of the assembling tool 3 (In a preferred embodiment of the present invention, said screwing is performed by rotating the adaptor 2 clockwise relative to the assembling tool 3).

Figure 3:
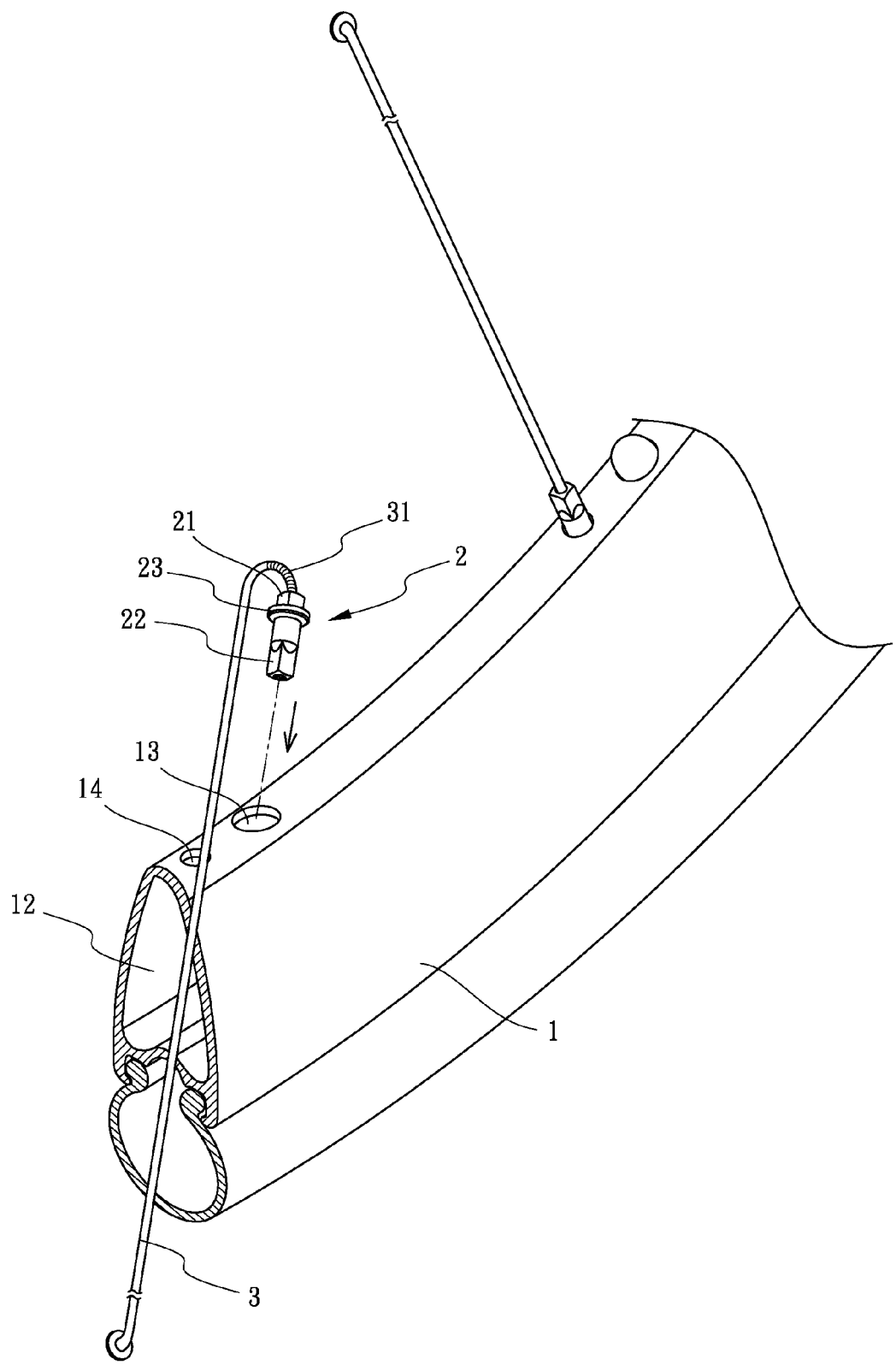
FIGS. 3-5 are partially perspective views for showing steps of assembling or disassembling spokes.
Figure 4:
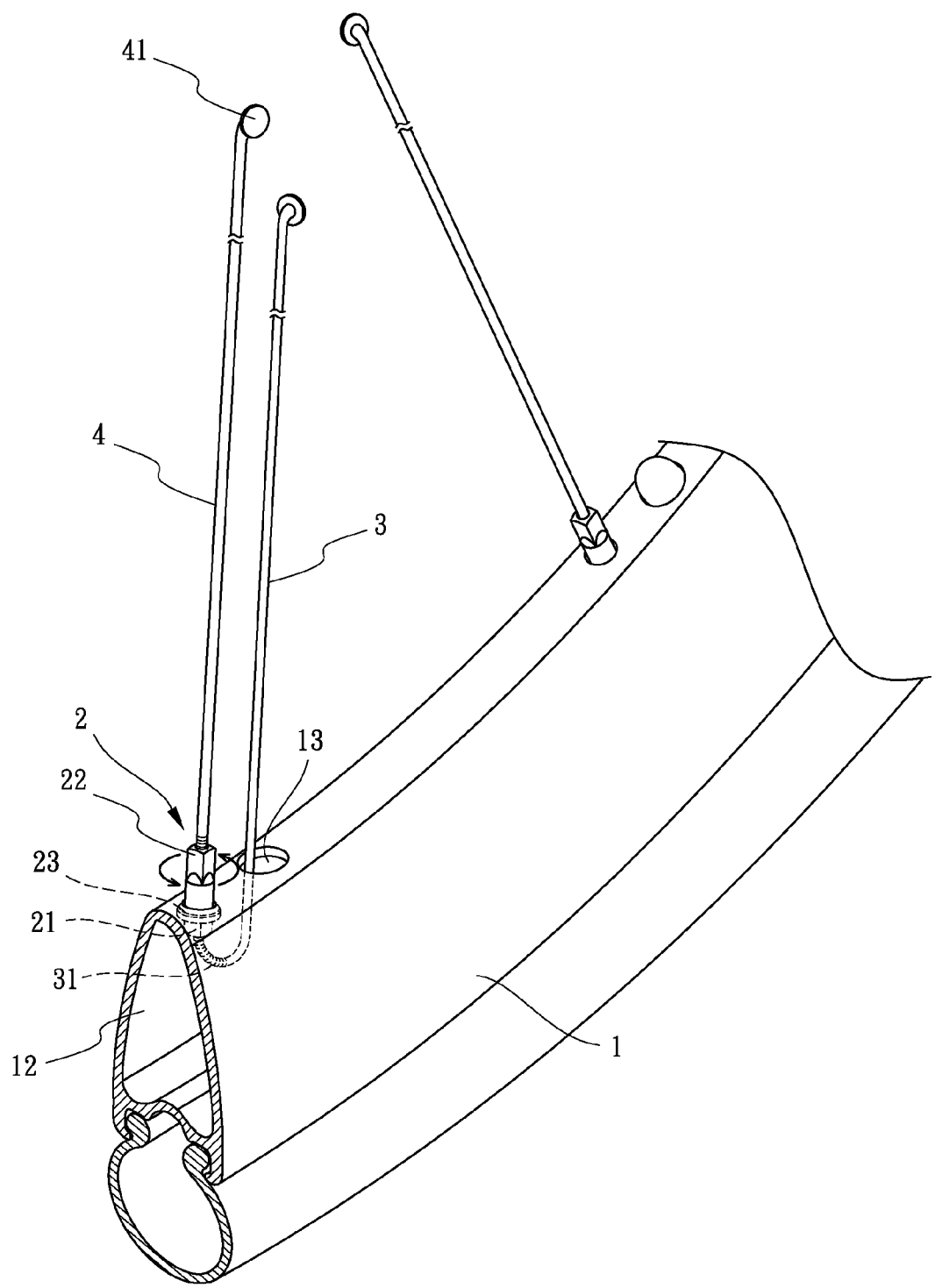
Figure 5:
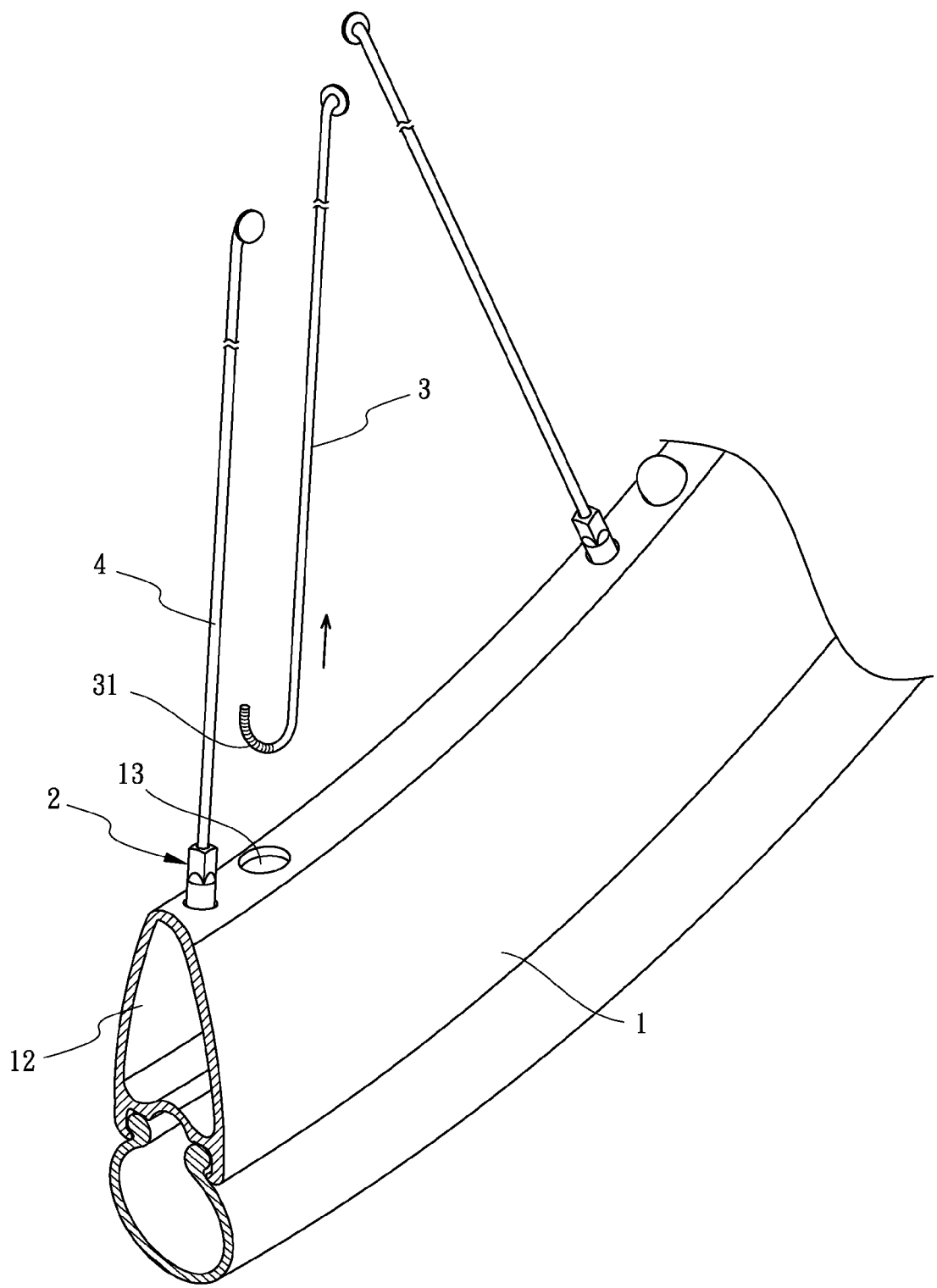

Third, assembling the adaptor 2 to the position hole 14: the second end 22 of the adaptor 2 is aligned with the through hole 13 firstly; then, the second end 22 and the first end 21 of the adaptor 2 is sequentially inserted into the through hole 13; and then, another end of the assembling tool 3 is rotated from the outer periphery of the rim 1 toward the inner periphery of the rim 1 (as shown in FIGS. 3-4), so that the second end 22 of the adaptor 2 passes through the corresponding position hole 14 from the channel 12 toward an outside relative to the rim 1; as a result, the adaptor 2 is positioned at the corresponding position hole 14. Therefore, the second end 22 of the adaptor 2 is located on the inner periphery of the rim 1 and the first end 21 of the adaptor 2 is located in the channel 12.

Fourth, assembling a spoke: one end of a spoke 4 is assembled onto a hub 5 and another end of the spoke 4 is inserted into the second end 22 of the adaptor 2.

Fifth, assembling the spoke to the adaptor 2 and disassembling the assembling tool 3 from the adaptor 2: the adaptor 2 is rotated counterclockwise so that another end of the spoke 4 is screwed into the second end 22 of the adaptor 2 and the hook portion 31 of the assembling tool 3 is unscrewed from the first end 21 of the adaptor 2 via said counterclockwise rotation; then, another end of the assembling tool 3 is rotated from the inner periphery of the rim 1 toward the outer periphery of the rim 1, so as to guide the hook portion 31 of the assembling tool 3 through the through hole 13; as a result, the assembling tool 3 is took out from the through hole 13 of the rim 1.

The method for assembling or disassembling spokes has several characteristics which are shown as following.

First, the spokes 4 are easy and convenient for a user to assemble or disassemble the spokes 4.

Second, a tension of the spoke 4 can be adjusted by rotating the adaptor 2.

Third, the spoke 4 and the rim 1 are connected by the adaptor 2 only, so that a connecting structure of the present invention is simple. In addition, the spoke 4 is securely screwed onto the adaptor 2 so that the spoke 4 will not be separated from the rim 1 unexpectedly.

Fourth, the distance is defined between each through hole 13 and each corresponding position hole 14. In addition, the structure of the rim 1 is not weakened by each through hole 13 and each corresponding position hole 14.

Upon disassembling the spoke 4 from the rim 1, the hook portion 31 of the assembling tool 3 passes through the through hole 13 and into the channel 12 firstly; then, the hook portion 31 of the assembling tool 3 is aligned with the first end 21 of the adaptor 2; thereafter, the adaptor 2 is rotated clockwise so as to screw the first end 21 of the adaptor 2 onto the hook portion 31 of the assembling tool 3 and unscrew the second end 22 of the adaptor 2 from the spoke 4; finally, the adaptor 2 and the hook portion 31 of the assembling tool 3 is took out from the channel 12 via the through hole 13 (the user can further use auxiliary tools so as to rotate the adaptor 2 in the process of assembling or disassembling the spoke 4).

Figure 6:
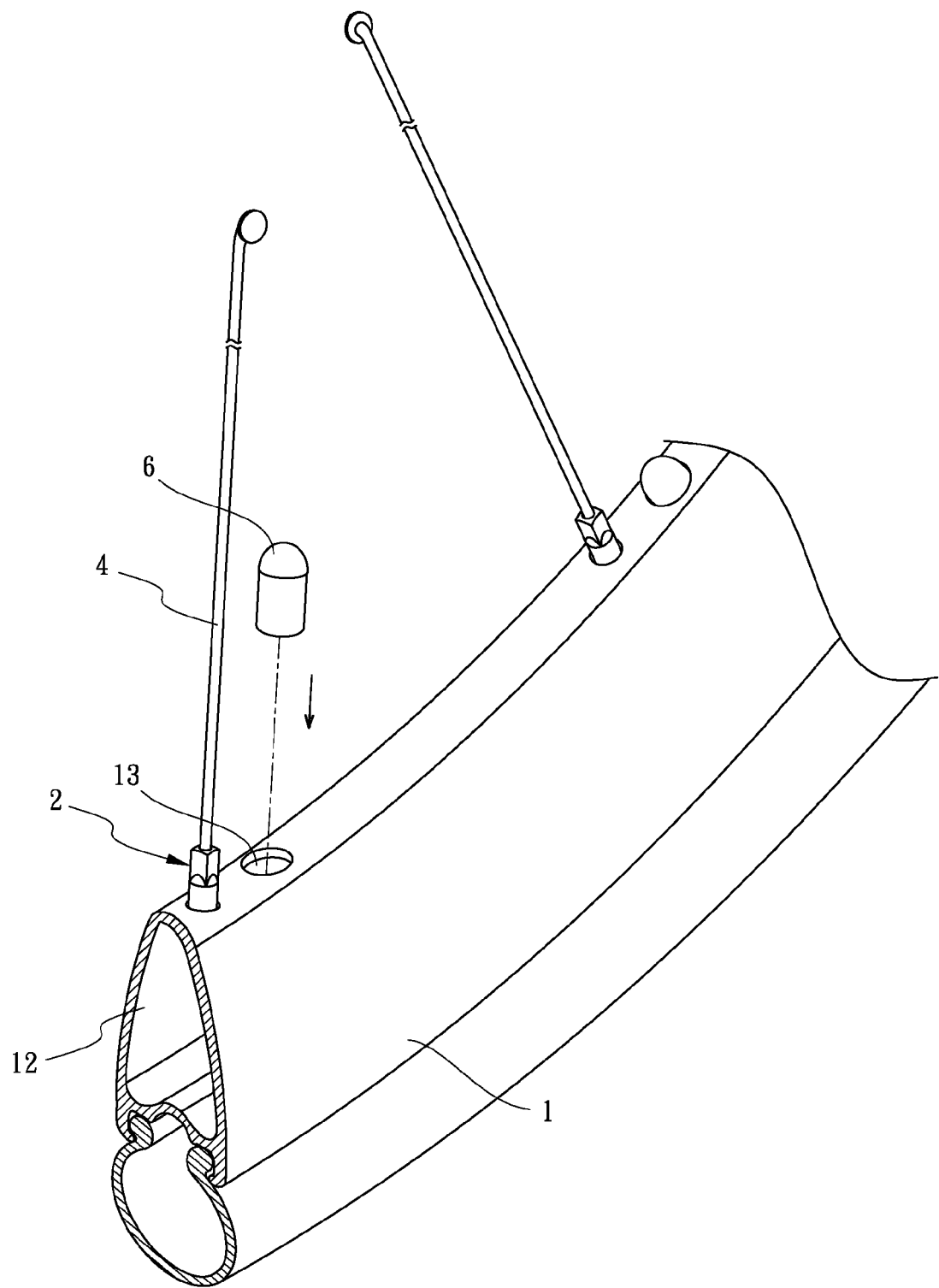
FIGS. 6-7 are partially perspective views for showing a flexible seal which is being assembled at a through hole.
Figure 7:
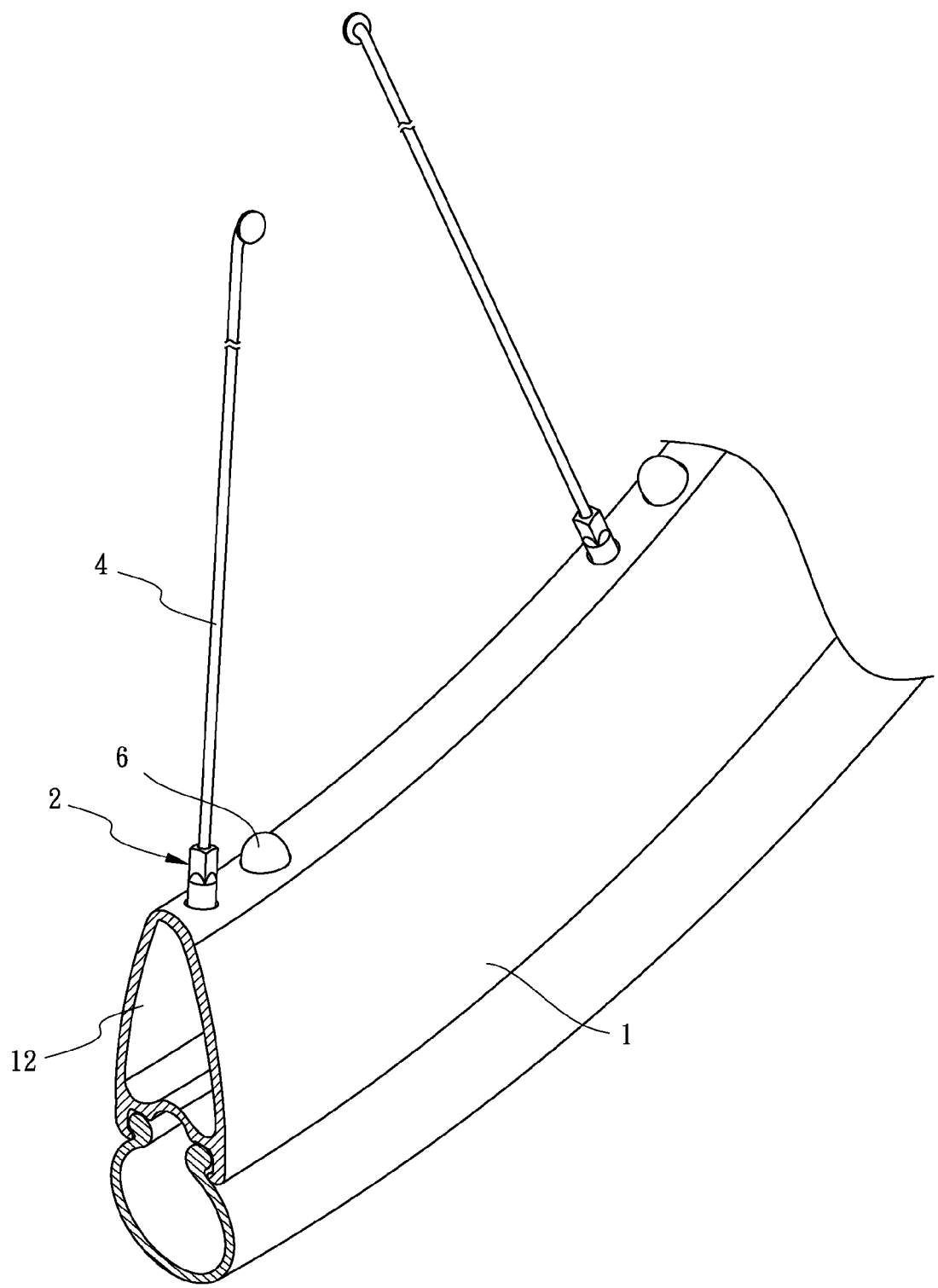

Referring to FIGS. 6-7, in order to prevent dust and foreign matters from entering the channel 12 via through hole 13, the present invention further comprises a flexible seal 6 (the flexible seal 6 is made of flexible materials, such as rubber . . . etc.). The flexible seal 6 is used to flexibly seal the through hole 13. The flexible seal 6 is normally assembled at the through hole 13. The flexible seal 6 can be removed from the through hole 13 before the hook portion 31 passes through the through hole 13.

Besides, an abutting portion 23 is formed between the first end 21 and the second end 22 of the adaptor 2. A cross-sectional area of the abutting portion 23 is larger than both a cross-sectional area of the first end 21 and a cross-sectional area of the second end 22. The cross-sectional area of the abutting portion 23 is also larger than an area of the position hole 14. Therefore, the adaptor 2 is abutted against a periphery of the position hole 14 via the abutting portion 23 so as to position the adaptor 2 securely at the position hole 14. The cross-sectional area of the abutting portion 23 is smaller than an area of the through hole 13; thereby, all the first end 21, the second end 22 and the abutting portion 23 of the adaptor 2 can pass through the through hole 13.

Furthermore, a circular buckle 41 is defined at on one end of the spoke 4. The circular buckle 41 of the spoke 4 is used to be buckled at the hub 5, so as to position the spoke 4 securely on the hub 5.

Although the invention has been explained in relation to its preferred embodiment, it is to be understood that many other possible modifications and variations can be made without departing from the spirit and scope of the invention as hereinafter claimed.

What is claimed is:

1. A method for assembling or disassembling spokes of a tubeless wheel comprising a plurality of steps:

first, selecting a rim: the rim having a tire assembling groove defined around an outer periphery thereof, a channel defined between the tire assembling groove and an inner periphery of the rim, a plurality of through holes and a plurality of position holes uniformly opened around the inner periphery of the rim therethrough, each through hole corresponding to each corresponding position hole, the through holes and the position holes all communicating with the channel, each through hole adjunct to each corresponding position hole, and a distance defined between each through hole and each corresponding position hole;

second, assembling an adaptor onto an assembling tool: the adaptor having a first end defined at one end thereof and a second end defined at another end thereof, the assembling tool having a hook portion defined at one end thereof, the first end of the adaptor screwed onto the hook portion of the assembling tool;

third, assembling the adaptor to the position hole: the second end and the first end of the adaptor sequentially inserted into the through hole firstly; and then, the assembling tool operated so as to make the second end of the adaptor pass through the corresponding position hole from the channel toward an outside relative to the rim; as a result, the adaptor positioned at the corresponding position hole;

fourth, assembling a spoke: one end of a spoke assembled onto a hub and another end of the spoke inserted into the second end of the adaptor; and fifth, assembling the spoke to the adaptor and disassembling the assembling tool from the adaptor: the adaptor rotated counterclockwise so that another end of the spoke screwed into the second end of the adaptor and the hook portion of the assembling tool unscrewed from the first end of the adaptor via said counterclockwise rotation; then, the assembling tool operated, so as to guide the hook portion of the assembling tool through the through hole, so that the assembling tool is took out from the through hole of the rim.

2. The method for assembling or disassembling spokes of a tubeless wheel as claimed in claim 1, wherein the present invention further comprises a flexible seal; the flexible seal is used to flexibly seal the through hole; the flexible seal is normally assembled at the through hole; the flexible seal is removed from the through hole before the hook portion passes through the through hole.

3. The method for assembling or disassembling spokes of a tubeless wheel as claimed in claim 1, wherein an abutting portion is formed between the first end and the second end of the adaptor; a cross-sectional area of the abutting portion is larger than both a cross-sectional area of the first end and a cross-sectional area of the second end.

4. The method for assembling or disassembling spokes of a tubeless wheel as claimed in claim 3, wherein the cross-sectional area of the abutting portion is larger than an area of the position hole, so that the adaptor is abutted against a periphery of the position hole via the abutting portion so as to position the adaptor securely at the position hole.

5. The method for assembling or disassembling spokes of a tubeless wheel as claimed in claim 3, wherein the cross-sectional area of the abutting portion is smaller than an area of the through hole.

6. The method for assembling or disassembling spokes of a tubeless wheel as claimed in claim 1, wherein a circular buckle is defined at on one end of the spoke; the circular buckle of the spoke is used to be buckled at the hub so as to position the spoke securely on the hub.

* * * * *